United States Patent
Shost

(10) Patent No.: US 6,467,495 B2
(45) Date of Patent: Oct. 22, 2002

(54) APPARATUS AND METHOD FOR SEALING A SOLENOID VALVE

(75) Inventor: Mark Anthony Shost, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/725,396

(22) Filed: Nov. 29, 2000

(65) Prior Publication Data

US 2002/0062859 A1 May 30, 2002

(51) Int. Cl.[7] ............................................... F16K 31/02
(52) U.S. Cl. ............................ 137/15.18; 251/129.15; 251/129.21
(58) Field of Search .................. 251/129.15, 129.18, 251/129.21; 123/520, 516, 519; 137/15.18

(56) References Cited

U.S. PATENT DOCUMENTS 4,791,958 A * 12/1988 Brundage .......... 251/129.21 X
5,560,585 A * 10/1996 Krimmer et al. ...... 251/129.21

* cited by examiner

Primary Examiner—Kevin Lee
(74) Attorney, Agent, or Firm—Margaret A. Dobrowitsky

(57) ABSTRACT

An evaporative control valve for a vehicle, the valve has a valve body for containing a solenoid that manipulates a plunger between an open position and a closed position, the plunger has a valve end and an adjustment end. The valve body also has a receiving area, a first port, as well as a conduit for connecting the first port to the receiving area. A port member is received and engaged within the receiving area and the port member provides a passageway from the receiving area to outside the valve body and the valve end seals the passageway when the plunger is in its closed position. The first port is aligned with and provides access to set the stroke of the solenoid.

30 Claims, 4 Drawing Sheets

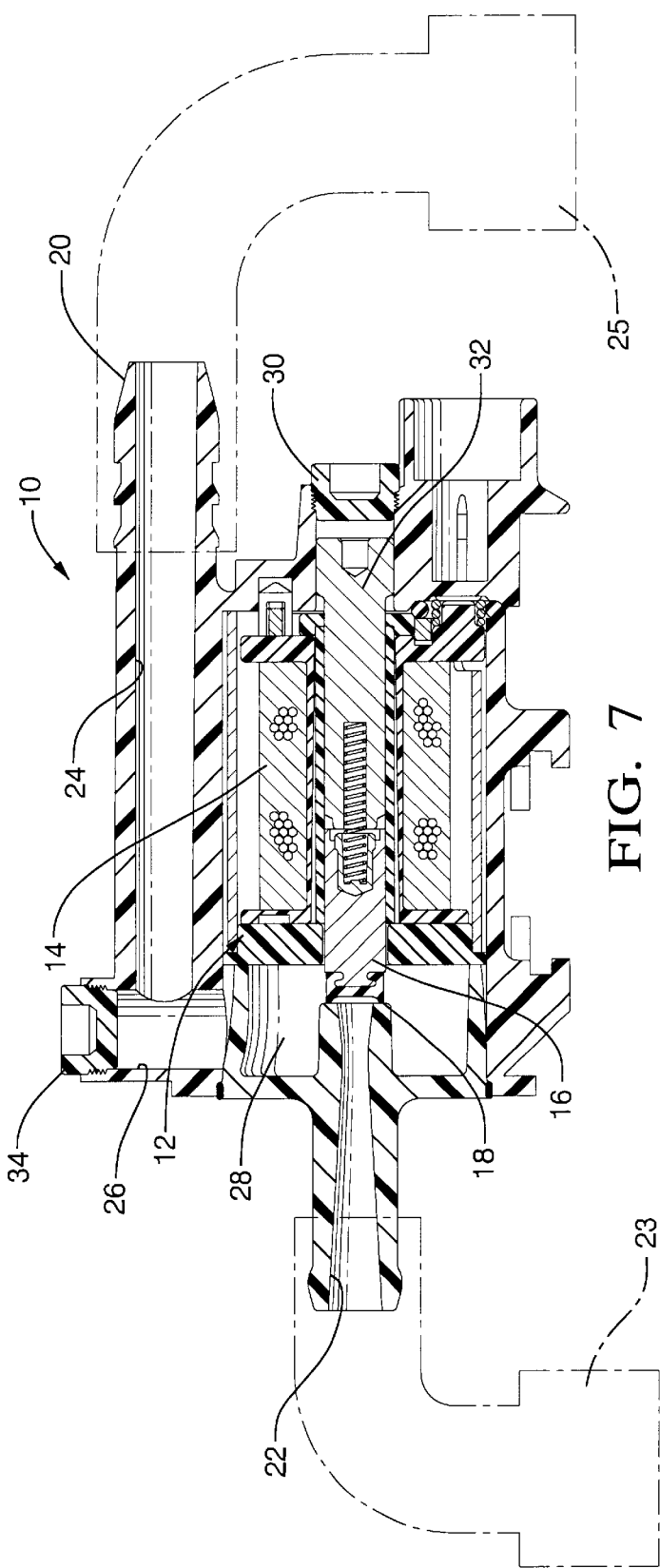
FIG. 7
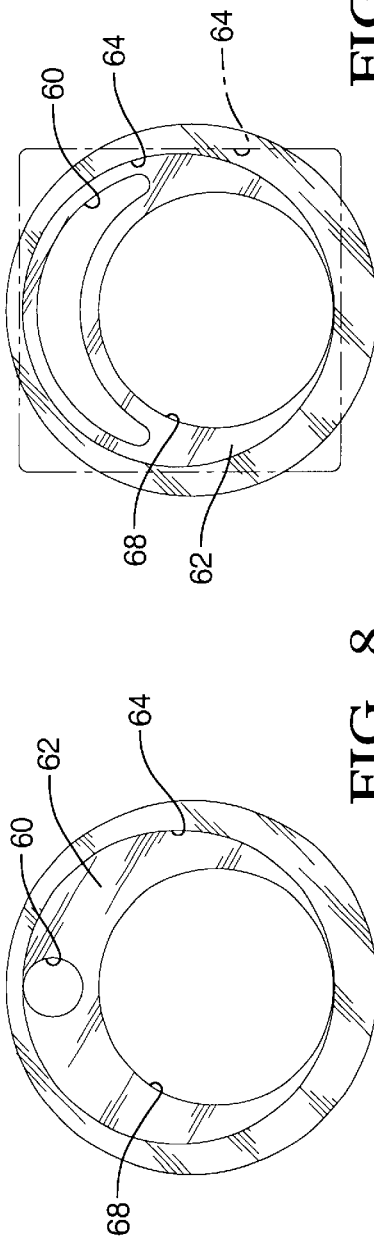
FIG. 8
FIG. 9

APPARATUS AND METHOD FOR SEALING A SOLENOID VALVE

TECHNICAL FIELD

The present invention relates to control valves and more particularly, to an apparatus and method for providing a solenoid actuated valve.

BACKGROUND OF THE INVENTION

Evaporative solenoid control valves (EVAP) are used to control the flow of fuel evaporate from a vehicle fuel storage tank to a purge canister and then onto either the intake manifold of an automotive engine or the atmosphere.

One such EVAP valve employs the use at least two plugs and an ultrasonic attachment process to seal the solenoid valve from external leaks. A first plug is used to facilitate the communication of a purge port to the interior cavity of the valve. Another plug is required for an opening to allow for adjustments to be made to the stroke of the solenoid.

However, the use of plugs in an EVAP valve assembly provides potential areas for leakage to occur. Moreover, the primary function of an EVAP valve depends on the transfer of gaseous materials from one point to another through the use of an EVAP valve. Accordingly, any leakage will affect the performance of the valve. In addition, the insertion and sealing of plugs to an EVAP valve assembly requires additional manufacturing steps that affect the cost of the same.

Therefore, an EVAP valve's design should prevent potential leakage areas as well as increase the performance and/or cost of the same. Accordingly, an EVAP valve's design should provide ease of assembly and disassembly, exhibit good magnetic flux transfer characteristics, provide an airtight passage from one point to another without impeding air flow and be cost-efficient.

SUMMARY OF THE INVENTION

An evaporative control valve for a vehicle having a valve body and a solenoid for manipulating a plunger mechanism between an open position and a closed position. The plunger has a valve end for opening and closing a first port into a receiving area. A conduit connects the receiving area to a second port and the second port is positioned to axially align with the plunger mechanism and the first port. In addition, the second port provides a means for accessing an adjustment screw to the stroke of a solenoid having a plunger.

The above-described and other features and advantages of the present invention will be appreciated and understood by those skilled in the art from the following detailed description, drawings, and appended claims.

BRIEF DESCRIPTION OF THE DRAWINGS

FIG. 7 is a cross-sectional view of an EVAP valve;

FIG. 8 is a view along lines 8—8 of the FIG. 3 embodiment; and

FIG. 9 is an alternative embodiment of the FIG. 8 embodiment.

DETAILED DESCRIPTION OF THE PREFERRED EMBODIMENT

Figure 1:
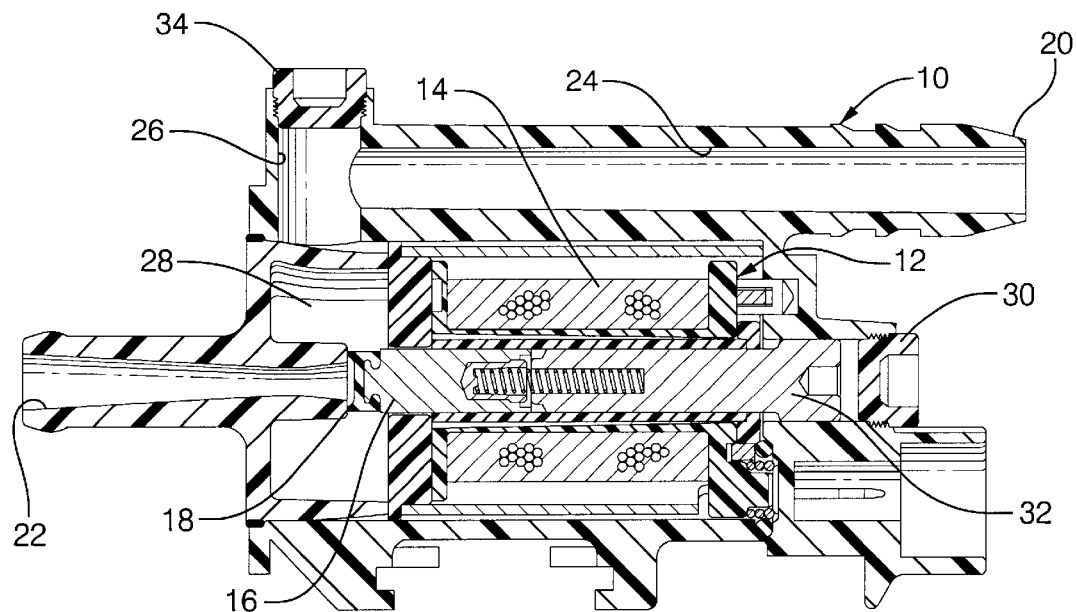
FIG. 1 is a cross-sectional view of an EVAP valve.

Referring now to FIGS. 1 and 7, an EVAP valve assembly 10 is illustrated. Valve assembly 10 includes a solenoid assembly 12 which in response to a magnetic flux generated by a coil 14, causes a plunger 16 to open and close a valve passageway 18. Valve passageway 18 provides a means for connecting a rear port 20 to a front port 22. Front port 22 is coupled to an intake manifold 23 and rear port 20 is coupled to a filtration canister 25 for use in an evaporative emission control system of a vehicle.

In addition, a side channel 24 connects rear port 20 to a cross slide channel 26. Cross slide 26 connects side channel 24 to a coil chamber 28. Accordingly, and as solenoid 12 manipulates valve 18 from a closed position to an open position, front port 22 is connected to rear port 20.

The EVAP valve assembly of FIG. 1 also includes a rear plug 30 which is inserted after the stroke of solenoid 12 is adjusted through the manipulation of an adjustment screw portion 32 of a stop 33 to vary the size of an air gap 35 between plunger 16 and stop 33. The size of air gap 35 relates to the stroke of solenoid 12. In addition, a spring 37 is positioned within corresponding cavities within plunger 16 and stop 33. Spring 37 provides an urging force to plunger 16 to return it to its unmanipulated (from solenoid 12) position. Once the stroke of solenoid 12 has been set by the adjustment of screw 32, rear plug 30 is permanently sealed to valve assembly 10.

Cross slide 26 is initially manufactured to have three openings, a first opening into side channel 24, a second opening into valve chamber 28 and a third opening to the exterior of valve assembly 10. The cross-slide is used to permit molding of the case. Channel 24 and chamber 28 pull vertically (axis of coil). Therefore, the cross slide connection is perpendicular and results in a side (third) opening in the case. This third opening is not desirable for function of the valve but is necessary to facilitate the molding process for the case.

A side plug 34 is permanently secured into the third opening of cross slide 26 in order to complete the passageway from front port 22 to rear port 20. Accordingly, the requirement of side plug 34 is a by product of the manufacturing process of valve assembly 10.

Figure 2:
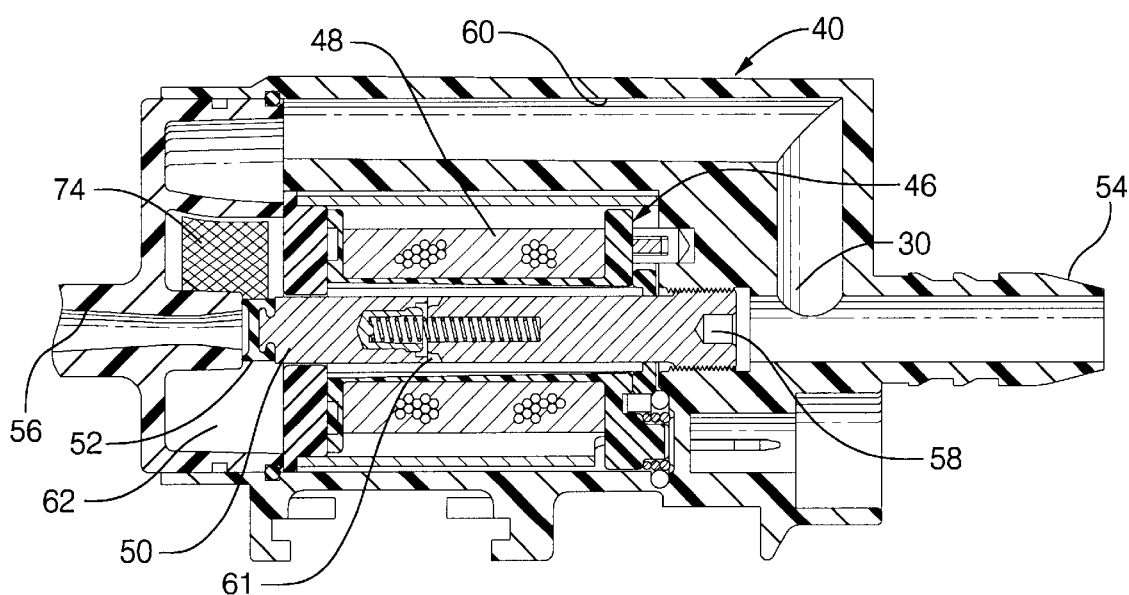
FIG. 2 is a cross-sectional view of an EVAP valve constructed in accordance with the instant application.
Figure 3:
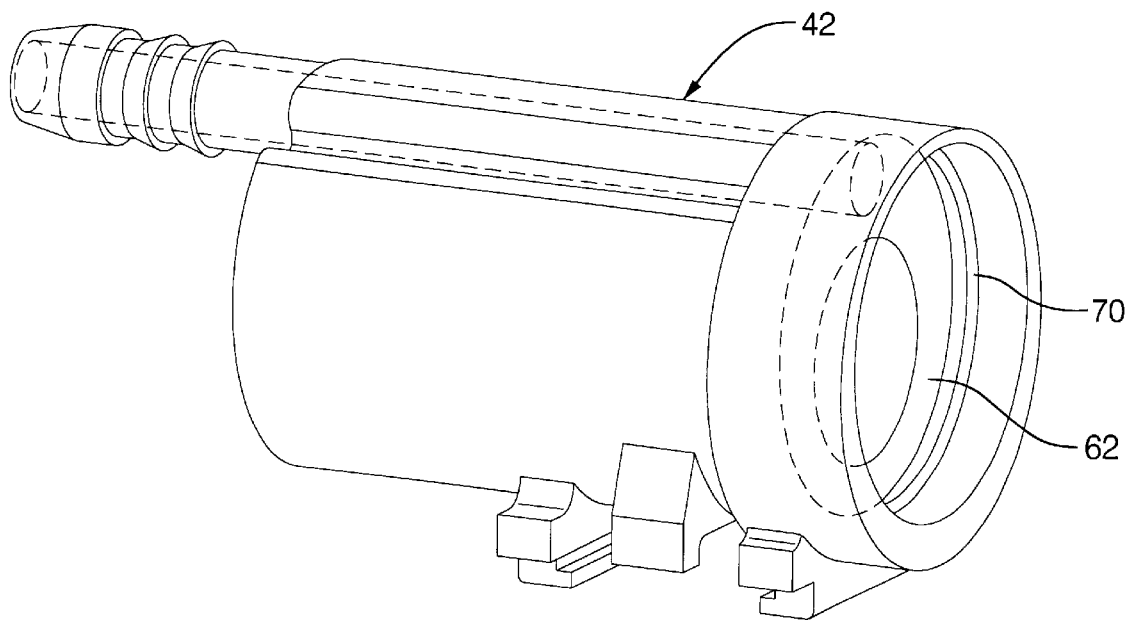
FIG. 3 is a perspective view of a portion of an EVAP valve constructed in accordance with the instant application.
Figure 4:
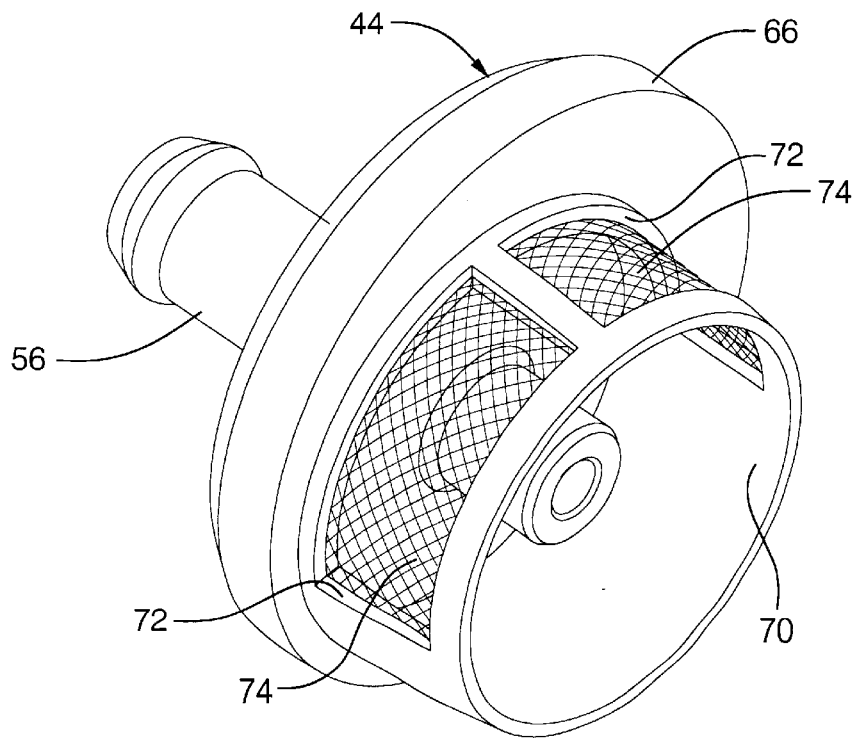
FIG. 4 is a perspective view of a portion of an EVAP valve constructed in accordance with the instant application.

Referring now to FIGS. 2–4, an EVAP valve assembly 40 constructed in accordance with an exemplary embodiment of the present invention is illustrated. EVAP valve assembly 40 has a main body portion 42 and a port 44. In an exemplary embodiment, valve assembly 40 and port 44 are constructed out of a lightweight, durable, nonconductive material, such as plastic that is easily manufactured, molded and secured to each other through ultrasonic welding.

It is noted that valve assembly 40 is configured to remove the need for rear plug 30 and side plug 34 illustrated in FIG. 1. The removal of plugs 30 and 34 allow for manufacturing cost reductions, as there are no unnecessary manufacturing steps required for the insertion and welding of plugs 30 and 34 to an EVAP valve.

Moreover, and since there is no use of a plug or plugs such as plugs 30 and 34 illustrated in FIG. 1, the configuration illustrated in FIGS. 2–4 has fewer seals and accordingly, a much lower rate of seal failure. In addition, and due the lesser amount of seals, there is a lesser amount of time required for seal testing. Furthermore, the only point requiring ultrasonic welding is the securement of port 44 to body portion 42.

In contrast, the design illustrated in FIG. 1 requires the insertion and welding of a front port 22 to the valve assembly as well as the insertion and securement of plugs 30 and 34.

Valve assembly 40 also includes a solenoid assembly 46. Solenoid assembly 46 is centrally located within valve assembly 40 and in response to a magnetic flux generated by a coil 48, a plunger 50 is manipulated from a closed position to an open position that causes a valve member 52 to open and close a valve passageway. In an exemplary embodiment, valve member 52 is constructed out of a flexible material, such as rubber, capable of sealing the valve passageway. Accordingly, solenoid 46, through the manipulation of valve member 52, provides a means for connecting a rear port 54 to a front port 56. As an alternative, solenoid assembly 46 is replaced by another mechanism capable of manipulating plunger 50 from an open position to a closed position.

Front port 56 is coupled to an intake manifold (not shown) at one end and makes intermittent contact with valve member 52 as it moves from an open position to a closed position. Rear port 54 is coupled to a filtration canister (not shown) for use in an evaporative emission control system of a vehicle.

Accordingly, and as solenoid assembly 46 manipulates valve 52 from a closed position to an open position, front port 56 is connected to rear port 54. Rear port 54 is positioned to align with an adjustment screw portion 58. Adjustment screw portion 58 allows an individual to adjust the stroke of solenoid assembly 46 by varying the position of a stop 59 with respect to plunger 50, thereby varying the size of an air gap 61 (i.e. stroke) between plunger 50 and stop 59. The adjustment of screw 58 will vary the stroke of the solenoid by either varying the biasing force placed upon plunger 50 by a spring or limiting the range of travel for plunger 50 by repositioning stop 59. A tool such as a screwdriver is inserted into port 54 in order to set the stroke of the solenoid. This is achieved by rotating adjustment screw portion 58 and accordingly varying the position of stop 59 with respect to plunger 50.

In contrast to the valve illustrated in FIG. 1, there is no requirement for a plug to be inserted and welded to the valve assembly after the stroke of the solenoid has been adjusted. Moreover, and since rear port 54 is configured to align with adjustment screw 58, the adjustment of solenoid assembly 48 may be made at any time during the manufacturing process. This allows for flexibility in the manufacture of valve assembly 40 as well as providing for a means for future adjustments to valve assembly 40, if necessary, in aftermarket applications.

A side channel 60 connects rear port 54 to a valve area or chamber 62. Side channel 60 has a configuration of sufficient dimensions to effectuate airflow from valve chamber 62 to port 54. Valve chamber 62 is connected to port 56 as valve member 52 moves from a closed position to an open position. Referring now to FIGS. 3, 4 and 8, valve chamber 62 has an outer diameter 64 large enough to receive and engage an engagement diameter 66 of port 44.

A portion of engagement diameter 66 is beveled to facilitate the insertion and engagement of port 44 into valve receiving area 62. Once port 54 is inserted into valve area 62, port 54 is ultrasonically welded to body 42.

Valve receiving area 62 also has an inner opening 68, and the diameter of inner opening 68 is sufficiently large enough to receive and engage a solenoid coil assembly 12. In addition, valve receiving area 62 also receives an inner annular wall 70 of port 44.

Annular wall 70 has a pair of openings 72. Openings 72 allow front port 56 to be connected to side channel 60 when valve member 52 is manipulated into an open position. Of course, and as applications may require, the number and size of openings 72 may vary.

Outer diameter 64 is also large enough to allow side channel 60 to have an opening into valve receiving area 62, as well as opening 68 for a solenoid assembly. This configuration allows valve assembly 40 to be manufactured without a cross slide as illustrated in FIG. 1. In addition, and since there is no cross slide into valve assembly 40, there is no requirement for a side plug.

As an alternative and referring now to FIG. 9, the size and configurations of side channel 60 and opening 68 may vary, however, it is contemplated that the dimensions of outer diameter 64 will be large enough to encompass side channel 60 and opening 68 regardless of their size and dimension.

In addition, and as an alternative, it is also contemplated that the size and configuration of receiving area 62, and accordingly port 44, may vary. For example, and as illustrated by the dashed lines in FIG. 9, receiving area 60 may have a rectangular configuration 64. Of course, port 44 will have a similar configuration for insertion into receiving area 62.

As an alternative, a pair of filters 74 are inserted into openings 72. Filters 74 will filter and screen out particulate matter which may accumulate in the canister of a vehicle. This filtering process will prevent such particulate matter from traveling into the intake manifold secured to front port 56. In order to facilitate the securement of filters 74 into openings 72, the periphery of opening 72 may be configured with a groove and/or channel in order to receive and engage the periphery of filters 74.

The design of EVAP valve assembly 40 allows the EVAP valve assembly to be completed in just two steps, namely, securing port 44 to valve body 42 and using a tool such as a screw driver to manipulate the stroke of the assembly by adjusting screw 58.

The final configuration provides two ports aligned along a common axis, with a plunger mechanism of a solenoid positioned intermediate to the two ports and along the same axis. The two ports are connected to each other through a common conduit via a valve chamber and an elbow.

In contrast, and in order to accomplish the same task with multiple seals, the valve assembly illustrated in FIG. 1 requires multiple steps such as insertion and securement of a port member into a valve body, insertion and securement of a side plug into the valve body, adjustment of the stroke of a solenoid assembly, and insertion and securement of a plug into the access area required for the adjustment of the stroke of the solenoid.

This design of the valve assembly also reduces assembly package mass and volume due to the reduction of components. In addition, this results in an overall component cost reduction.

Figure 5:
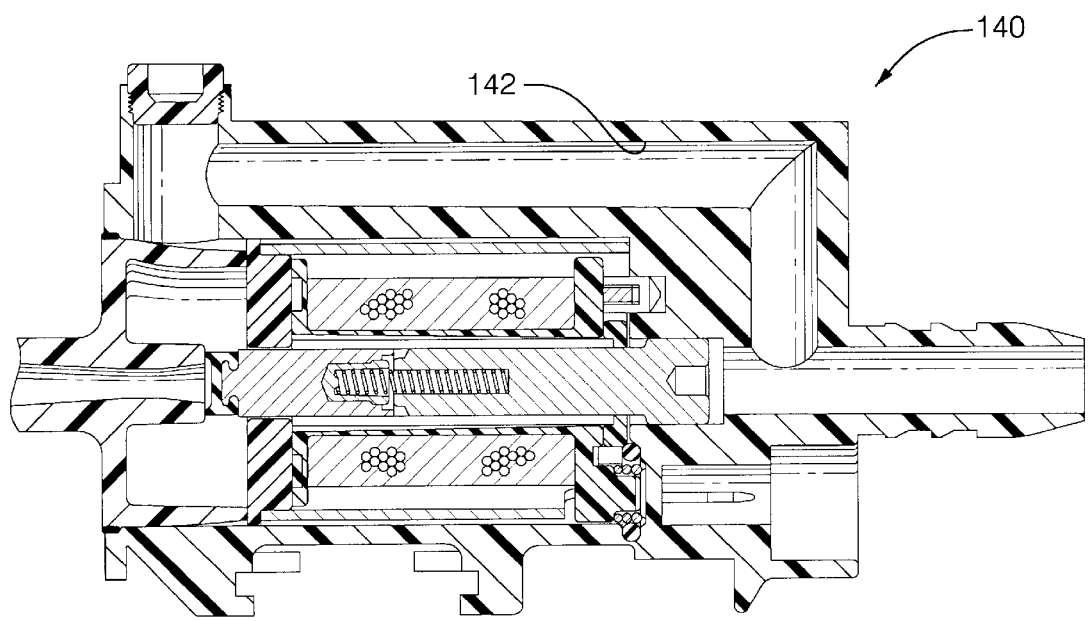
FIG. 5 is an alternative embodiment of the present invention.

Referring now to FIG. 5, an alternative embodiment of the present invention is illustrated. Here, component parts performing similar and/or analogous functions are numbered in multiples of 100. Here, a valve assembly 140 has a valve body 142 with a configuration that removes the need for a rear plug, as illustrated in FIG. 1.

Figure 6:
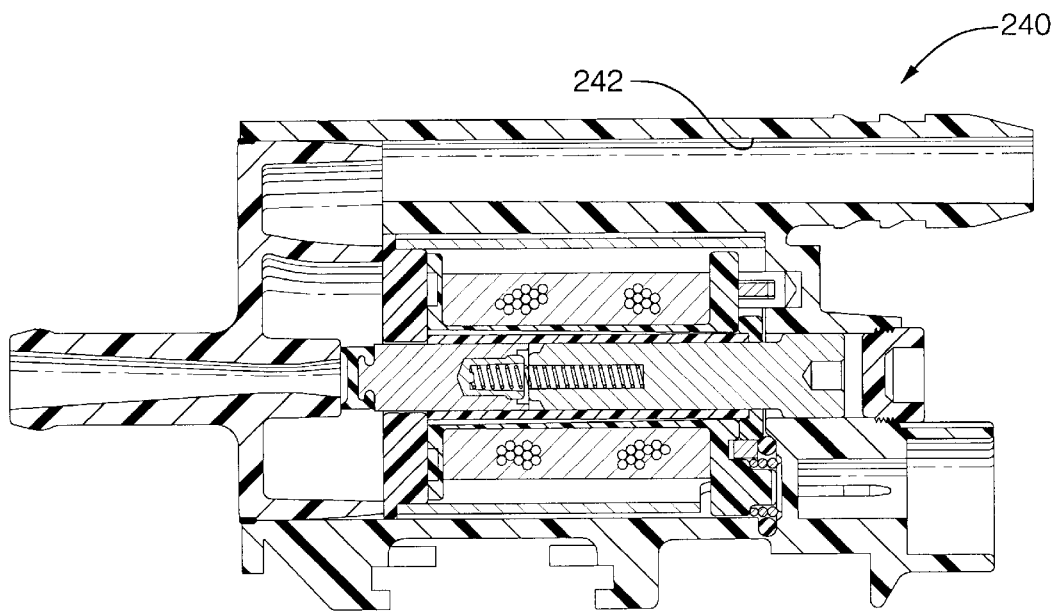
FIG. 6 is another alternative embodiment of the present invention.

Referring now to FIG. 6, yet another alternative embodiment of the present invention is illustrated. Here, a valve assembly 240 has a valve body 242 and a port 244 configuration which remove the requirement for a side plug, as illustrated in FIG. 1.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Accordingly, it is to be understood that the present invention has been described by way of illustration and not limitation.

What is claimed is:

1. A solenoid valve assembly comprising:
   a) a valve body, comprising:
      i) a solenoid for generating a magnetic flux for manipulating a plunger between an open position and a closed position, said plunger having a valve end;
      ii) a receiving area;
      iii) a first port; and
      iv) a conduit for connecting said first port to said receiving area;
   b) a port member being configured and dimensioned to be received and engaged within said receiving area, said port member communicating with said receiving area and said valve end sealing said port member when said plunger is in said closed position.

2. The solenoid valve assembly as in claim 1, wherein said solenoid valve is used in an evaporative control valve of a vehicle.

3. A solenoid valve assembly comprising:
   a valve body, comprising:
      a solenoid for generating a magnetic flux for manipulating a plunger between an open position and a closed position, said plunger having a valve end;
      a receiving area;
      a first port; and
      a conduit for connecting said first port to said receiving area;
      a port member being configured and dimensioned to be received and engaged within said receiving area, said port member communicating with said receiving area and said valve end sealing said port member when said plunger is in said closed position, wherein said receiving area of said solenoid valve body is configured and dimensioned to have an opening into a first receiving area and said conduit, said first receiving area receiving and engaging said solenoid.

4. The solenoid valve assembly as in claim 3, wherein said conduit connects said receiving area to said first port.

5. The solenoid valve assembly as in claim 4, wherein said port member has an outer diameter slightly smaller than said receiving area.

6. The solenoid valve assembly as in claim 4, wherein said port member has an outer diameter slightly smaller than said receiving area and said port member has an annular wall being configured, dimensioned and positioned for being received and engaged within said receiving area.

7. An evaporative control valve for a vehicle, comprising:
   a) a valve body, comprising:
      i) a solenoid for manipulating a plunger between an open position and a closed position, said plunger having a valve end;
      ii) a receiving area;
      iii) a first port; and
      iv) a conduit for connecting said first port to said receiving area;
   b) a port member being configured and dimensioned to be received and engaged within said receiving area, said port member providing a passageway from said receiving area to outside said valve body and said valve end sealing said passageway when said plunger is in said closed position.

8. An evaporative control valve for a vehicle, comprising:
   a valve body, comprising:
      a solenoid for manipulating a plunger between an open position and a closed position, said plunger having a valve end;
      a receiving area;
      a first port; and
      a conduit for connecting said first port to said receiving area;
      a port member being configured and dimensioned to be received and engaged within said receiving area, said port member providing a passageway from said receiving area to outside said valve body and said valve end sealing said passageway when said plunger is in said closed position, wherein said receiving area of said solenoid valve body connects with a first annular receiving area.

9. The evaporative control valve as in claim 8, wherein said first annular receiving area is configured and dimensioned to receive and engage said solenoid.

10. The evaporative control valve as in claim 8, wherein said port member has an outer diameter slightly smaller than said receiving area and said port member has an annular wall being configured, dimensioned and positioned for being received and engaged within said receiving area and said annular wall has at least one opening.

11. The evaporative control valve as in claim 10, wherein said valve member protrudes into said receiving area.

12. The evaporative control valve as in claim 10, wherein said opening receives and engages a filter member.

13. An evaporative control valve for a vehicle, comprising:
   a) a valve body, comprising:
      i) a solenoid for manipulating a plunger between an open position and a closed position, said plunger having a valve end and an adjustment end;
      ii) a receiving area;
      iii) a first port; and
      iv) a conduit for connecting said first port to said receiving area;
   b) a port member being configured and dimensioned to be received and engaged within said receiving area, said port member providing a passageway from said receiving area to outside said valve body and said valve end sealing said passageway when said plunger is in said closed position.

14. The evaporative control valve as in claim 13, wherein said first port is configured, dimensioned and positioned to provide access for adjustments to an adjustment screw on said adjustment end of said plunger.

15. The evaporative control valve as in claim 13, wherein said first port, said passageway of said port member and said plunger are axially aligned along a center line of said control valve and said conduit travels from said first port to a point axially removed from said center line and then said conduit travels from said point in a line substantially parallel to said center line until it reaches said receiving area.

16. The evaporative control valve as in claim 15, wherein said conduit has an L shape.

17. The evaporative control valve as in claim 13, wherein said conduit has an L shape.

18. An evaporative control valve for a vehicle, comprising:
   a valve body, comprising:
      a solenoid for manipulating a plunger between an open position and a closed position, said plunger having a valve end and an adjustment end;
      a receiving area;
      a first port; and
      a conduit for connecting said first port to said receiving area;
      a port member being configured and dimensioned to be received and engaged within said receiving area, said port member providing a passageway from said receiving area to outside said valve body and said valve end sealing said passageway when said plunger is in said closed position, wherein said first port is aligned with said adjustment end of said plunger and said first port provides access for adjustments to an adjustment screw on a stop of the evaporative control valve.

19. A method of assembling a solenoid valve assembly, comprising:
   a) inserting a port member into a receiving area of said solenoid valve assembly, said port member providing a means for connecting said receiving area outside said valve assembly;
   b) welding said port member to said valve assembly; and
   c) adjusting the stroke of said solenoid valve assembly by inserting a tool through a first port of said assembly, said first port communicating with said receiving area through a conduit.

20. A method of adjusting the stroke of a valve assembly, comprising:
   repositioning a limit of a range of a plunger of the valve assembly by inserting a tool into a first port of the valve assembly, said tool making contact with an adjustment end of a stop in order to re-define said limit, said stop defining a limit of travel of said plunger, said first port being aligned with said adjustment end of said stop.

21. The method as in claim 20, wherein said repositioning occurs after the assembly has been fully assembled.

22. A valve assembly, comprising:
   a valve body configured to have a receiving area, a first port and conduit for fluidly connecting said receiving area to said first port;
   a port member being configured to be received within said receiving area, said port member having a second port being in fluid communication with said receiving area when said port member is inserted into said receiving area, said port member having an annular wall being configured to be received within said receiving area, wherein said first port and said second port are in fluid communication when said port member is inserted to said receiving area.

23. The valve assembly as in claim 22, further comprising:
   a plunger being slidably received within said valve body, said plunger being capable of movement in a range defined by an open position and a closed position, said plunger having a valve end, said valve end sealing said second port of said port member when said plunger is in said closed position.

24. A valve assembly as in claim 23, wherein said plunger is moved in said range by a magnetic flux generated by a solenoid of the valve assembly, said solenoid and said plunger being received within an inner opening of said valve body, said inner opening being accessible from said receiving area.

25. The valve assembly as in claim 22, wherein said port member has an inner annular wall disposed within said annular wall said inner annular wall allowing for fluid communication between said conduit and said receiving area.

26. The valve assembly as in claim 25, wherein said inner annular wall has a least one screen disposed therein.

27. The valve assembly as in claim 22, wherein said annular wall is chamfered along its periphery.

28. The valve assembly as in claim 22, wherein said valve body and said port member are plastic and said port member is ultra-sonically welded to said valve body.

29. A valve assembly, comprising:
   a valve body;
   an annular receiving area disposed in said valve body and being configured to receive a port member;
   a conduit being in fluid communication with said annular receiving area;
   a port member being configured to be received within said annular receiving area, said port member having an opening being in fluid communication with said receiving area and an exterior of the solenoid valve assembly when said port member is inserted into said receiving area, said port member having an annular wall being configured to be received within said receiving area;
   a solenoid assembly being disposed in an inner opening of said valve body, said solenoid assembly comprising a plunger having a valve end and a stop having an adjustment end, said adjustment end of said stop being aligned with a port opening of the solenoid valve assembly.

30. The solenoid valve assembly as in claim 29, wherein said port opening is in fluid communication with said opening of said port member when said plunger is in an open position.

* * * * *